United States Patent [19]

Bott

[11] 4,165,827
[45] Aug. 28, 1979

[54] VEHICLE ARTICLE CARRIER

[76] Inventor: John A. Bott, 931 Lakeshore Dr., Grosse Pointe Shores, Mich. 48236

[21] Appl. No.: 823,631

[22] Filed: Aug. 11, 1977

Related U.S. Application Data

[63] Continuation-in-part of Ser. No. 798,576, May 19, 1977, which is a continuation-in-part of Ser. No. 725,500, Sep. 22, 1976.

[51] Int. Cl.² .............................................. B60R 9/00
[52] U.S. Cl. .................................................. 224/326
[58] Field of Search .......... 224/29 R, 42.1 R, 42.1 D, 224/42.1 E, 42.1 F, 42.1 G; 280/179 R; 105/475, 478, 479, 480, 481, 482

[56] References Cited

U.S. PATENT DOCUMENTS

| 3,181,753 | 5/1965 | Fitch | 224/42.1 E |
| 3,836,058 | 9/1974 | Penniman et al. | 224/42.1 F |
| 4,055,284 | 10/1977 | Bott | 224/42.1 D |

FOREIGN PATENT DOCUMENTS

2508217  1/1976  Fed. Rep. of Germany ........ 224/29 R

*Primary Examiner*—Trygve M. Blix
*Assistant Examiner*—Winston H. Douglas
*Attorney, Agent, or Firm*—Harness, Dickey & Pierce

[57] ABSTRACT

An article carrier mounted on a generally flat exterior surface of an automotive vehicle and consisting of a plurality of spaced parallel slat assemblies which are fabricated, for example, of roll-formed sheet metal and are provided with fastening elements having a body that is located at least in part within the interior of the slats; the slats being formed with openings which provide access to the fastening elements in order that containers, transverse slats, or other article securing devices may be cooperable with the elements in securing articles to the article carrier. Additionally, removable cover members may be provided which are adapted to be inserted in the slat openings to close off either the entire opening such as when the article carrier is not in use or only unused portions of the opening.

12 Claims, 25 Drawing Figures

VEHICLE ARTICLE CARRIER

BACKGROUND OF THE INVENTION

This is a continuation-in-part of my application entitled Vehicle Article Carrier bearing Ser. No. 798,576 filed May, 19, 1977, pending which is a continuation-in-part of my application entilted Vehicle Article Carrier bearing Ser. No. 725,500 filed Sept. 22, 1976, pending.

The present invention is directed generally to fastening devices for use with article carriers for automotive vehicles. More particularly, the present invention is directed to a new and improved fastening device adapted for use with the slat assemblies of article carriers of the type shown in U.S. Patent application Ser. No. 604,643, filed Aug. 14, 1975, now U.S. Pat. No. 4,055,284.

SUMMARY OF THE INVENTION

The article carrier of the present invention consists of a plurality of slat assemblies each of which is fabricated of a roll-formed sheet metal, such as stainless steel, and which are adapted to be mounted in spaced parallel relationship on a generally flat surface portion of an associated automotive vehicle. The slat assemblies may be provided with article or load constraining side rails and/or an article carrying container for securing articles, such as boxes, luggage, etc., upon the carrier. In accordance with the present invention, certain of the slat assemblies have openings formed therein that provide access to fastening elements which have at least part of their body portions located interiorly of the associated slat assembly. In certain embodiments of the present invention, the fastening elements are located completely interiorly of the slat assembly and may include eyelet openings, while in other embodiments, eyelet openings associated with the fastening elements are located exteriorly of the associated slat assemblies.

DESCRIPTION OF THE PREFERRED EMBODIMENTS

Figure 1:
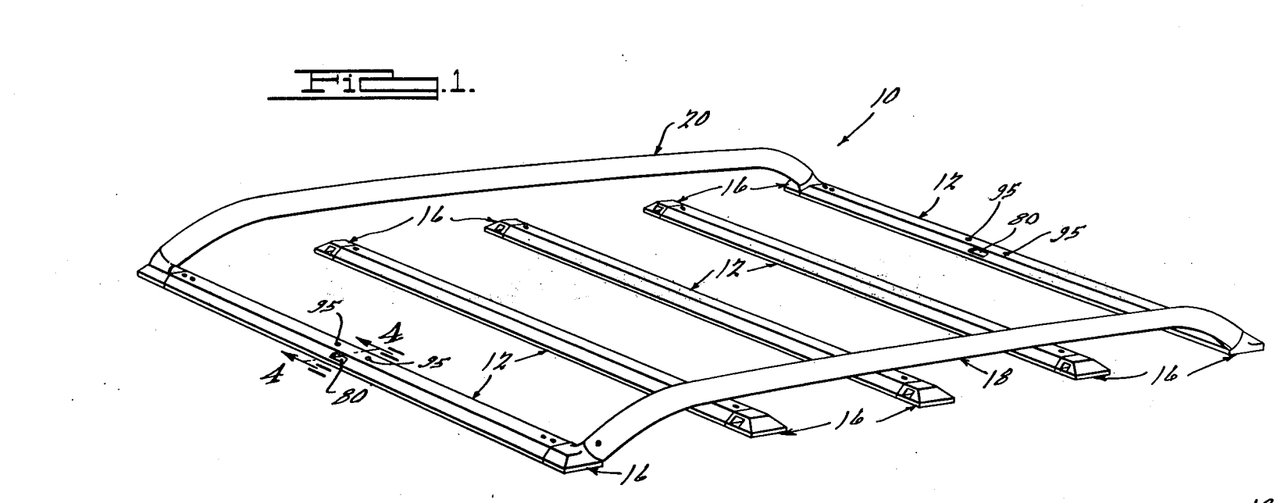
FIG. 1 is an elevated perspective view of an article carrier for an automative vehicle and incorporating the principles of the present invention therein.
Figure 2:
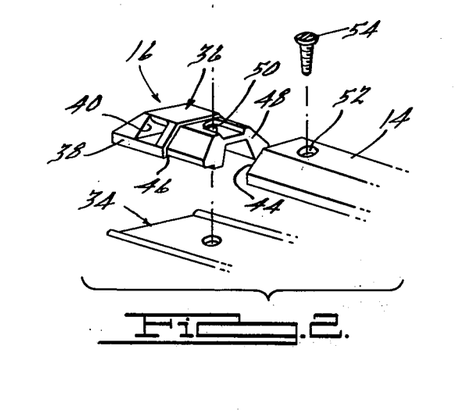
FIG. 2 is an exploded assembly view of one end of one of the slat assemblies incorporated in the article carrier shown in FIG. 1.
Figure 3:
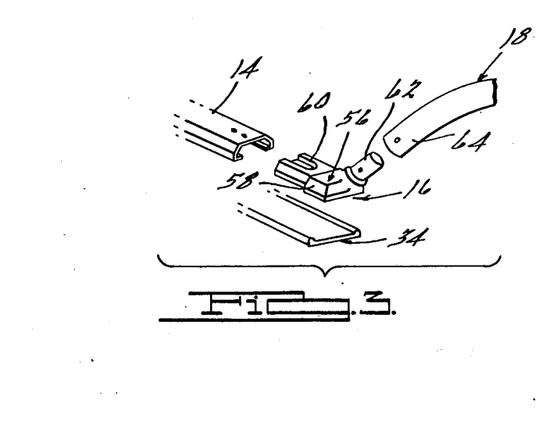
FIG. 3 is an exploded assembly drawing of one end of another of the slat assemblies incorporated in the article carrier of FIG. 1.

Referring now in detail to the drawings and in particular to FIGS. 1-3 thereof, a vehicle article carrier 10, in accordance with one preferred embodiment of the present invention, is shown as comprising a plurality of spaced parallel slat assemblies 12 which are adapted to be fixedly secured to a substantially flat, horizontal surface portion of an associated automotive vehicle (not shown). Each of the slat assemblies 12 comprises a generally hollow roll-formed sheet metal slat 14 which is suitably secured to the associated vehicle surface and is provided with end members 16 at the opposite ends thereof. In the embodiment of the present invention illustrated in FIG. 1, the article carrier 10 includes a pair of load constraining side rails 18 and 20 which are arranged in spaced parallel relationship and extend generally perpendicular to the plurality of slat assemblies 12. As will hereinafter be described, the opposite ends of the rails 18, 20 are secured to selected of the slat assemblies 12 via the associated end members 16, whereby to provide a unitized structure for carrying articles, such as boxes, luggage, and the like upon the associated vehicle surface.

Figures 4, 5, 6, 9, 10, 11:
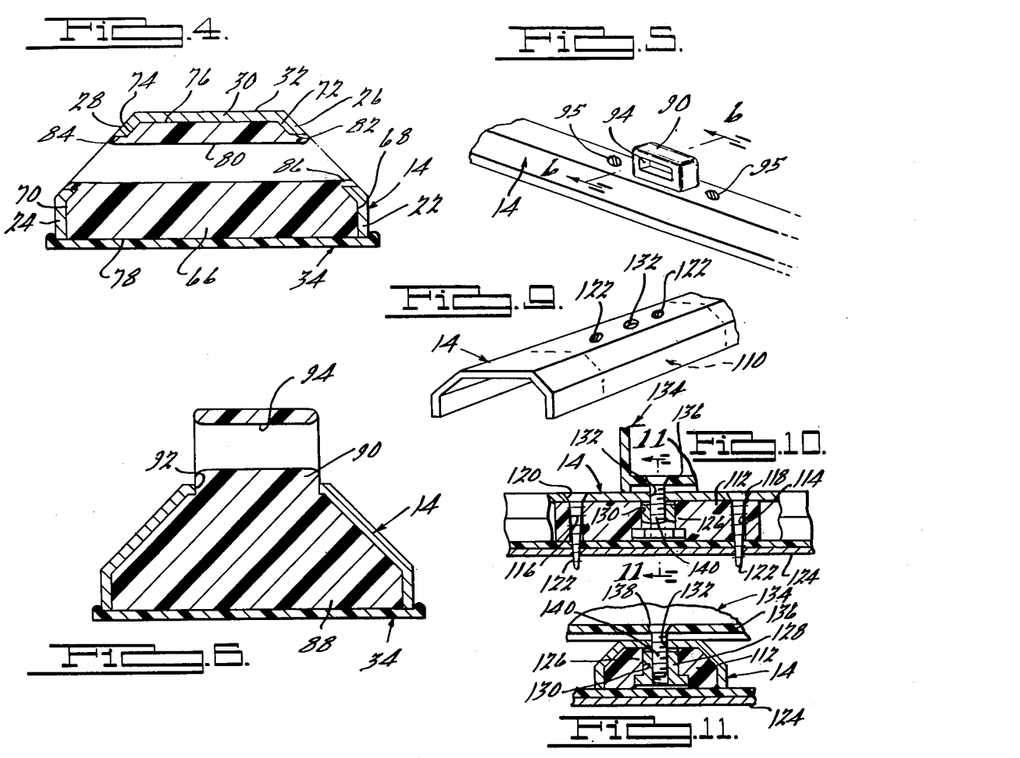
FIG. 4 is an enlarged transverse cross-sectional view taken substantially along the line 4—4 of FIG. 1.
FIG. 5 is an elevated perspective view of an alternate embodiment of a tie-down member incorporated in the article carrier of the present invention.
FIG. 6 is an enlarged transverse cross-sectional view taken substantially along the line 6—6 of FIG. 5.
FIG. 9 is an elevated perspective view of another embodiment of the present invention.
FIG. 10 is an enlarged transverse cross-sectional view of the structure shown in FIG. 9.
FIG. 11 is a transverse cross-sectional view taken substantially along the line 11—11 of FIG. 10.

As best seen in FIG. 4, each of the slats 14 comprises a pair of spaced parallel side walls 22, 24 which terminate at their upper edges in upwardly converging walls 26 and 28, respectively. Extending between the upper edges of the walls 26, 28 is a flat horizontally extending upper wall 30 which defines a horizontal support surface 32. The lower marginal edges of the side walls 22, 24 may be in-turned if desired (not shown) and are adapted to bear upon a suitable mounting pad, representatively designated by the numeral 34, which is coextensive of each of the slats 14 and is fabricated, for example, of a suitable resilient material, such as natural or synthetic rubber, or a suitable synthetic polymeric material.

With the exception of the end members 16 utilized in operatively supporting the side rails 18, 20, the end members 16 of the balance of the slat assemblies 12 constitute end caps 36 of the type shown in FIG. 2 and including a body 38 fabricated of a resinous plastic material, for example, by injection molding or the like. Each of the end caps 38 comprises a transversely extending opening or tie-down eyelet 40 which extends laterally therethrough and is adapted to engage the terminal end 44 of the associated slat 14 with a shoulder 46 defined around the outer periphery of a tongue portion 48 which is in turn adapted to be inserted into the interior of the associated slat 14. The tongue portion 48 is formed with a suitable central aperture 50 adapted to be aligned with a similar opening 52 within the adjacent end of the slat 14 for receiving a suitable fastening element, such as a screw, bolt, or the like 54 for operatively securing the end cap 36 within the adjacent end of the slat 14. It may be desirable to utilize a fastening element 54 of sufficient size (length) so that it may be threadably engaged directly with the portion of the associated vehicle upon which the carrier 10 is mounted, whereby such fastening element or screw 54 will serve the two-fold purpose of operatively securing the end cap 56 to the slat 14, and securing the adjacent end of the entire slat assembly 12 to the support surface, as will be appreciated by those skilled in the art and as indicated in the aforementioned copending patent application, Ser. No. 604,643.

The end members 16 operatively associated with the side rails 18, 20 are in the form of stanchion members 56, one of which is shown in detail in FIG. 3 as comprising a stanchion body 58 having a tongue portion 60 adapted to be operatively inserted into the end portion of the associated slat 14 and have suitable fastening means, such as the aforementioned fastening element 54, operatively secure the member 56 to the associated slat 14. The stanchion body 58 includes an upwardly extending, generally cylindrically shaped support portion 62 adapted to be telescopically received within the downwardly extending hollow end portion 64 of the associated side rails 18, 20, and means in the form of a suitable transversely extending screw, bolt, or the like (not shown) may be utilized for securing the side rail end portion 64 to the cylindrical stanchion portion 62, as will be appreciated by those skilled in the art.

In accordance with the principles of the present invention, it may be desirable to provide one or more of the slat assemblies 12 with intermediate tie-down devices, i.e., tie-down devices by which a suitable rope, strap, or similar securing device may be operatively secured to the slat assemblies 12, at some location thereon other than at the opposite ends thereof. Such a tie-down arrangement is best seen in FIGS. 4–8, and the embodiment shown in FIG. 4 includes a tie-down body 66 which is defined by side walls 68, 70, upwardly converging walls 72, 74, a top wall 76, and a bottom wall 78. The size and shape of the walls 68–78 are designed such that the body 66 is of the same transverse cross section as the interior of the associated slat 14. Accordingly, upon operative assembly of the body 66 into the associated slat 14, said body will assume the entire interior portion of the slat 14 along the length thereof occupied by the body 66, which length may typically be in the order of one to two inches of the overall length of the associated slat 14. The body 66 is formed with an eyelet opening 80 which is adapted to be aligned with openings 82 and 84 formed in the upwardly converging walls 26, 28 of the associated slat 14 upon assembly of the body 66 therein, whereby a suitable rope, strap, or the like may be inserted through the openings 82, 84 and eyelet opening 80 for securing said fastening device to the slat assembly 12. It is to be noted that the body 66 may be provided with a peripheral outwardly projecting portion 86 at each end of the eyelet opening 80 whereby to prevent chaffing or other undesirable wear of the securing device, i.e., rope, strap, etc., upon movement relative to the edges of the openings 82, 84 of the slat 14. One particularly important feature of the tie-down arrangement thus described resides in the fact that the entire tie-down body 66 is located interiorly of the associated slat 14, whereby to be completely concealed from view, with the exception of the eyelet openings thereof. Additionally, by virtue of being located within the slat 14, articles, such as boxes, luggage, etc., may be mounted upon the support surface 32 directly above the body 66.

FIGS. 5 and 6 illustrate an alternate embodiment of the present invention wherein a tie-down body 88 is located directly within an associated slat 14 and is intended to occupy the entire interior thereof throughout the length of the slat 14 in which the body 88 is disposed. The body 88 is provided with an integral upwardly extending portion 90 which projects through a suitable opening 92 in the top wall 30 of the associated slat 14, as illustrated in FIG. 6. The upwardly projecting portion 90 is formed with an eyelet opening 94 which is arranged generally transversely of the associated slat 14 and is adapted for cooperation with a suitable rop, strap, or similar article securing device, as will be appreciated by those skilled in the art.

As best seen in FIG. 5, means in the form of suitable threaded fastening elements 95 consisting of screws, bolts, or the like may be located on the opposite sides of the eyelet opening 94 and extend downwardly through the slat 14, the body 88, and be threadably engaged with the underlying vehicle body panel. Similar such fastening means may be utilized for securing the body 66 within the slats 12 in the embodiment of the present invention shown in FIG. 1, as indicated by the numeral 95.

Figures 7, 8, 12:
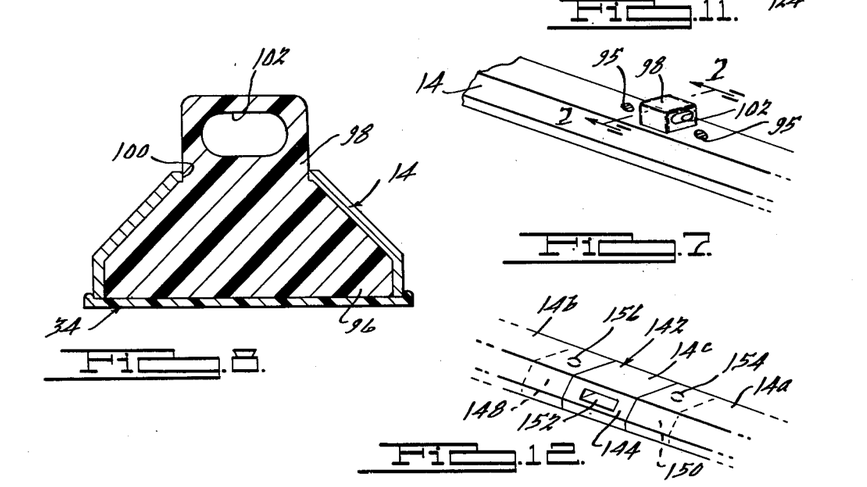
FIG. 7 is an elevated perspective view similar to FIG. 5 and illustrates another embodiment of a tie-down member incorporated in the article carrier of the present invention.
FIG. 8 is an enlarged transverse cross-sectional view taken substantially along the line 8—8 of FIG. 7.
FIG. 12 is an elevated perspective view of yet another embodiment of the present invention.
Figure 13:
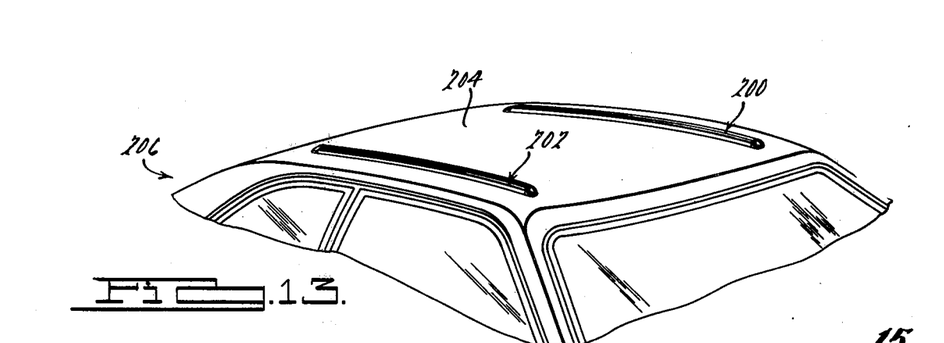
FIG. 13 is a perspective view of a portion of a vehicle having a pair of longitudinally extending slats in accordance with the present invention secured thereto.

FIGS. 7 and 8 illustrate a similar type tie-down arrangement wherein a tie-down body 96 is located within the slat 14 and includes an upwardly projecting portion 98 which extends through a suitable opening 100 in the top wall 30. The projecting portion 98 differs from the portion 90 in that the portion 98 is formed with an eyelet opening 102 which is arranged parallel to the length of the associated slat 14 (as opposed to transversely thereof). Suitable fastening means 95, such as the aforementioned screws, bolts, or the like, may be located on the opposite sides of the portion 98 for securing both the slat 14 and the body 96 to the underlying portion of the associated vehicle. Thus, it will be seen that the tie-down bodies may be varied in accordance with specified applications such that the eyelet openings thereof may extend either parallel or transversely of the associated slats and/or may be located above the slats or interiorly thereof, as in the case with the arrangement shown in FIG. 4. The various tie-down bodies may be fabricated of any suitable material, such as a molded plastic material, and the openings may be formed in the associated slats 14 by any convenient material forming operation, such as by a suitable stamping operation, as is well known in the art. It is to be noted that while only two of the intermediate tie-down devices are depicted in the article carrier 10 shown in FIG. 1, it will be readily appreciated that two or more such intermediate tie-down devices may be provided in any one of the slat assemblies 12, and that all of such assemblies or only certain selected ones thereof may be provided therewith, whereby to provide for universality of application in accordance with the particular type of articles to be carried.

The principles of the present invention are not limited solely to the concept of operatively associating an eyelet opening with an article carrying slat, as indicated in FIGS. 9-11, wherein a fastening element 110 is depicted for securing an article container or the like upon the associated slat, such as the aforementioned slat 14. The fastening element 110 includes a body 112 which is presumably of the same cross-sectional shape as the interior of the slat 14 and is located interiorly thereof, as best seen in FIGS. 10 and 11. The body 112 is formed with longitudinally spaced apart vertical bores 114 and 116 which are adapted to be aligned with openings or bores 118, 120, respectively, formed in the upper wall of the slat 14. With this arrangement, suitable screws, bolts, or other fastening devices 122 may extend downwardly through the aligned openings 114, 118 and 116, 120 and be threadably engaged with the underlying vehicle body panel, as designated by the numeral 124.

Disposed between the bores 114, 116 is a threaded portion, generally designated by the numeral 126. The threaded portion 126 may be provided by a variety of different means and is disclosed herein in the form of a riv-nut 128 which is cast or molded interiorly of the body 112 so as to define a vertical interiorly threaded bore 130 which is in turn vertically aligned with an opening 132 formed in the slat 114. As best seen in FIGS. 10 and 11, an article carrying container or the like representatively designated by the numeral 134 may be supported directly upon the upper side of the slat 14 (and various other slats, depending upon the size of the container). The container 134 is shown as having a bottom section 136 having an opening 138 formed therein, which opening 138 is vertically aligned with the opening 132 in the slat 14 such that a suitable fastening element 140 may extend downwardly through the openings 138, 132 and be threadably engaged with the riv-nut 128. It will be appreciated, of course, that the number of fastening elements 110 to be used with a particular container will vary with the size and shape of such container, as well as with the number and orientation of slats in a particular luggage carrier design. Accordingly, the present invention is not intended to be limited solely to the use of a single such element 110, since a multiplicity thereof may be required for containers or other types of article carriers of any substantial size.

FIG. 12 illustrates still a further embodiment of the present invention which is generally similar to the arrangement shown in FIGS. 1 and 4, but which is adapted to be utilized when two slat sections, herein designated 14a and 14b are arranged in longitudinal alignment. In particular, FIG. 12 illustrates a fastening element 142 having a body 144 which defines a central part 146 of the same general cross-sectional shape as the exterior of the slat sections 14a and 14b. The body 144 also includes a pair of outwardly extending end portions 148 and 150 which are presumably, although not necessarily, of the same transverse cross-sectional shape as the interior of the slat sections 14a and 14b and adapted to be received within the confronting ends thereof in the manner shown in FIG. 12. The central part 146 of the body 144 is formed with a transverse eyelet opening 152 which may be similar to the opening 40 previously described herein, and means in the form of suitable screws, bolts, or the like 154 may extend downwardly through the adjacent ends of the slat sections 14a and 14b, as well as through the end portions 148, 150 of the element 142 for operatively securing the entire assemblage to the underlying vehicle body panel.

Referring now to FIGS. 13 through 16, there is shown another embodiment of the present invention comprising a pair of slats 200 and 202 mounted in spaced parallel relationship to a portion 204 of a motor vehicle 206. It should be noted that while slats 200 and 202 are illustrated herein as being secured to a roof portion of a motor vehicle, they may be easily secured to any other relatively flat, preferably substantially, horizontal portion in like manner as described hereinafter. As slat members 200 and 202 are substantially identical, only one such slat is illustrated and will be described in detail with reference to FIGS. 14 through 16 and 18.

Figures 14, 15:
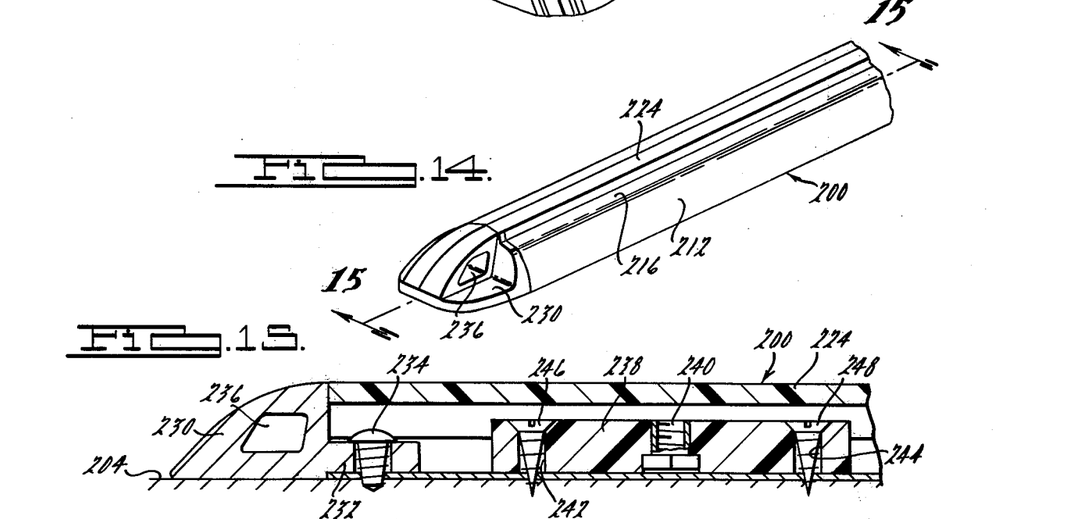
FIG. 14 is an enlarged perspective view of a portion of one of the slats of FIG. 13.
FIG. 15 is a longitudinal sectional view of the portion of the slat of FIG. 14 taken along line 15—15 thereof.

As illustrated, slat 200 comprises a lower vehicle engaging portion 208 with laterally disposed upwardly extending converging sidewall portions 210, 212 and generally horizontally inwardly extending upper wall portions 213, 214 defining article supporting surfaces 215, 216. A pair of spaced depending flange portions 218, 220 extend interiorly of slat member 200 from each of upper wall portions 213 and 214 and define a longitudinally extending opening 222 therebetween which is coextensive of slat 200. A cover member 224 is also provided having portions 226, 228 adapted to be inserted within opening 222 so as to close off the interior of slat 200 at such time as they are not being used in their capacity as article carriers so as to prevent entry of dirt, snow, ice or the like. As shown therein, cover member 224 may be coextensive with the length of slat 200. However, it should be noted, that should it be desirable, cover member 224 may be easily fabricated in suitable lengths to enclose portions of opening 222 which are not being used when the article carrying members hereinafter described are installed in operative relationship to slats 200 and 202.

Figure 18:
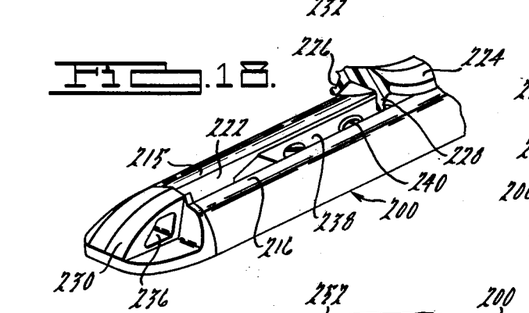
FIG. 18 is a perspective view of a portion of a slat having a corner member partially installed therein all in accordance with the present invention.
Figure 19:
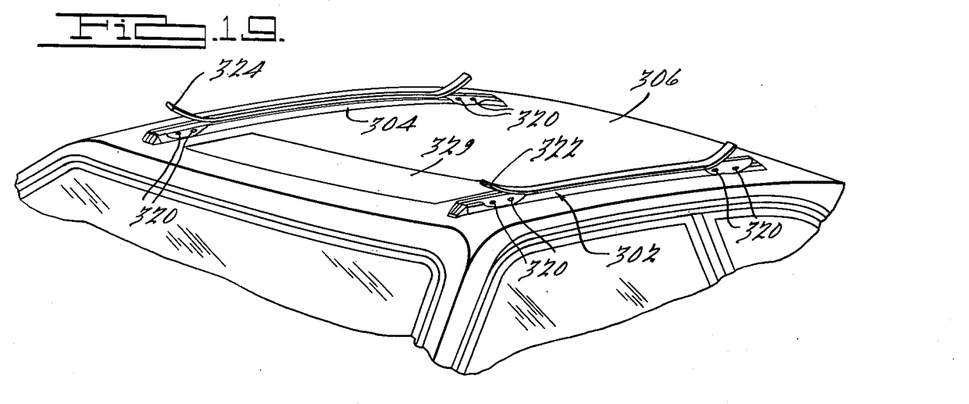
FIG. 19 is a perspective view of a portion of a vehicle having a pair of slat members secured thereto with cover members partially removed.

An end cap 230 is also provided which has a tab portion 232 projecting into the interior of slat member 200 and is adapted to be secured therein by a fastener 234 extending therethrough which also acts to secure slat member to the vehicle. End cap 230 may be of any desired shape and may be provided with an eyelet 236 extending therethrough so as to facilitate the attachment of ropes or straps which may be used to secure an article to the carrier.

Figure 17:
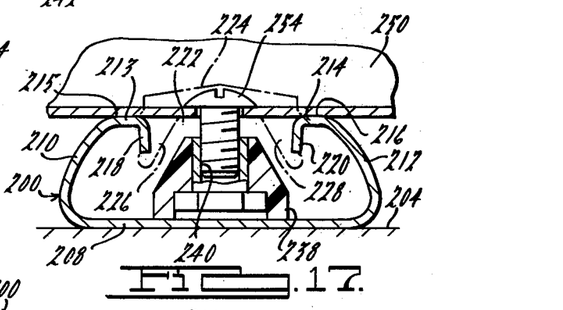
FIG. 17 is a cross-sectional view of the longitudinal and transverse slats of FIG. 16 taken along line 17—17 thereof.

As best seen in FIGS. 15 and 17, a fastening element 238 is disposed within the interior of slat 200 in spaced relationship to sidewalls 210, 212, upper wall portions 213, 214 and flange portions 218, 220 and comprises an elongated member having a threaded portion 240 provided therein such as for example a riv-nut embedded therein. Fastening element 238 has a pair of spaced holes 242, 244 provided therein adapted to receive screws 246, 248 for securing the fastening element to the slat as well as securing the slat to a portion of the motor vehicle. Threaded portion 240 of the fastening element 238 is adapted to receive securing means associated with article carrying means so as to retain article carrying means in position upon article supporting surfaces 215, 216 of the slat member 200.

Figure 16:
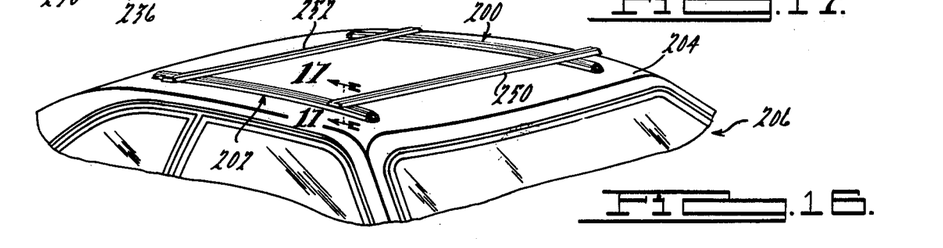
FIG. 16 is a perspective view of a portion of a vehicle having a pair of longitudinally extending slats to which a pair of transversely extending slats are secured.

As shown in FIG. 16, the article carrying means comprises a pair of transversely extending slat members 250, 252 which may be removably installed across parallel slats 200 and 202. Article carrying means 250, 252 are adapted to be secured by threaded fasteners 254 which threadedly engage threaded portion 240 of the fastening element 238 thereby clamping the article carrying means in position upon article supporting surfaces 215, 216 of slat 200 and corresponding surfaces of slat 202. Thus, when article carrying means 250, 252 are installed in transverse relation to longitudinally extending slat members 200, 202, they provide a surface for supporting and securing any desired article to the motor vehicle. It should be noted that while only two such article carrying means 250, 252 are shown secured adjacent opposite ends of each of the slat members 200 and 202, any number of such article carrying means may be secured to the longitudinally extending slat members in like manner so as to form a desired load supporting surface upon the portion of the motor vehicle. Further, should it be desired, any number of fastener elements 238 may also be provided within each of longitudinally extending slats 200, 202 so as to allow a pair of article carrying means 250, 252 to be mounted in varying spaced apart relationship. When the article carrier is not in use, article carrying means 250, 252 may be easily removed by merely removing the securing means 254. Cover member 224 may then be installed in opening 222 so as to prevent snow, ice or other debris from accumulating in the article supporting slats 200, 202. Further, as the article carrier requires only two article supporting slats to be secured to the vehicle, it presents a clean uncluttered appearance which does not detract from the lines of the vehicle. Also, the cover member, in addition to preventing debris, snow or ice from entering the channel portion of the slat members which could prevent installation of the article carrying means thereon, also performs a decorative function enhancing the appearance of the slats. It should also be noted that should it be desired, the cover members may be sectioned and so as to allow them to be installed between article carrying means thus, also providing a means for preventing the accumulation of snow or ice when the carrier is in use.

Referring now to FIGS. 19 through 23, yet another embodiment of the present invention is illustrated. As seen therein an article carrier is provided which comprises a pair of elongated slats 302 and 304 which are secured in a substantially parallel spaced relationship to a portion 306 of a motor vehicle. Slats 302 and 304 may each be substantially identical to slat 200 of FIG. 17 comprising a lower surface 308, upwardly converging sidewall portions 310 and 312, and spaced article supporting surfaces 314 and 316 defining a longitudinally extending opening 318 therebetween. A plurality of well nut fasteners 320 are provided which operate to secure slats 302 and 304 to vehicle portion 306. Removable cover members 322 and 324 are also provided which conceal opening 318 such as when the article carrier is not in use.

Figure 20:
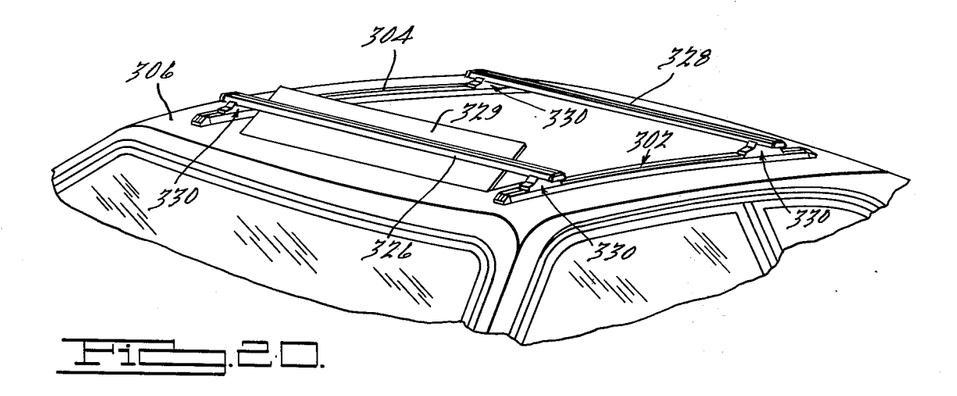
FIG. 20 is a perspective view of the slat members and vehicle portion of FIG. 19 having a pair of transverse slats supportingly secured to saddle members in accordance with the present invention.

As best seen in FIG. 20, a pair of transversely extending article carrying slats 326 and 328 are provided which are supportingly secured to saddle members 330 which in turn are supported upon and secured to slats 302 and 304 at appropriate locations. Saddle members 330 operate to support transverse slats 326 and 328 in spaced relationship to portion 306 of the vehicle so as to enable slats 302 and 304 to be laterally spaced a maximum distance without concern as to the degree of curvature imparted to vehicle portion 306. Further, this spaced relationship may allow a vehicle having a vent or sunroof opening 329 in this location to operate without requiring the transverse slats to be removed therefrom.

Figure 21:
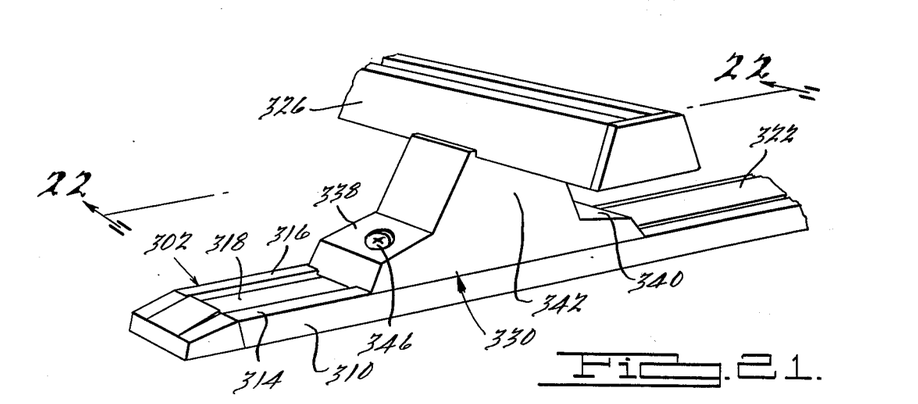
FIG. 21 is an enlarged perspective view of a portion of the assembled article carrier of FIG. 20.
Figure 22:
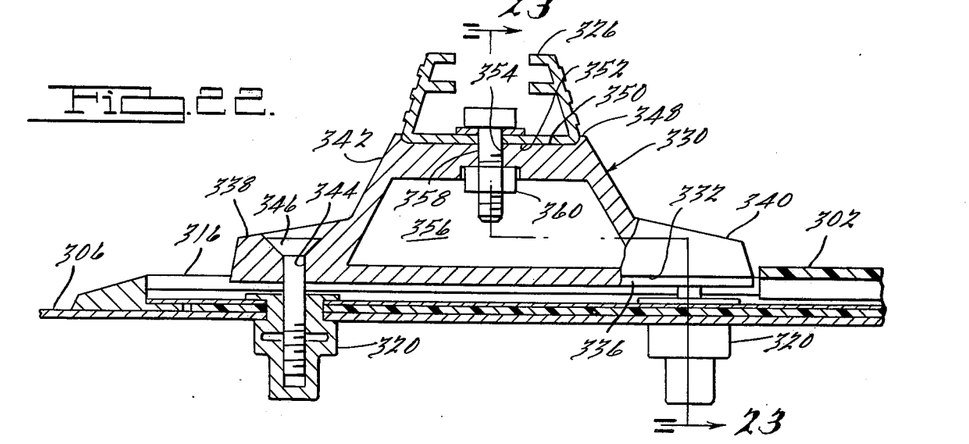
FIG. 22 is a sectional view of the assembled article carrier, the section being taken along line 22—22 of FIG. 21.
Figure 23:
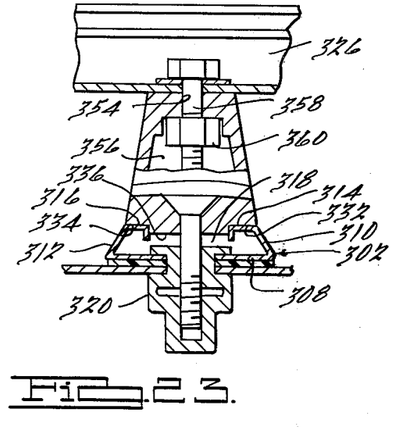
FIG. 23 is a sectional view similar to that of FIG. 22 but with the section taken along line 23—23 of FIG. 21.

As each of the saddle members 330 are substantially identical, only one such member will be described in detail with reference to FIGS. 21 through 23 in which it is illustrated in installed relationship to a portion of slat 302. Saddle member 330 comprises an elongated member of a width approximately equal to the width of slat 302 and includes a lower surface having a pair of laterally spaced elongated recessed shoulders 332 and 334 which engage article supporting surfaces 314 and 316 of slat 302. Depending center portion 336 is received within opening 318 of slat 302 and aids in preventing lateral shifting thereof. A pair of securing flange portions 338 and 340 project outward from opposite ends of a main body portion 342 and each are provided with a bore 344 extending therethrough which is adapted to receive fasteners 346 for securing saddle 330 in position. As seen therein, fasteners 346 are preferably in the form of screws which extend through bore 344 and are threadedly received in well nut fasteners 320 which also operates to secure slat 302 to vehicle portion 306.

Main body portion 342 includes an upper surface 348 having a transverse recessed portion 350 contoured to receive a lower surface 352 of transversely extending slat 326. A central bore 354 is provided therethrough which extends into a cavity 356 provided in main body portion 342 which is adapted to receive a fastener 358 for securing transverse slat 326 in position thereon. The lower end of bore 354 may be enlarged slightly and of a hexagonal or square cross-sectional shape so as to receive and prevent rotation of nut 360 disposed therein.

Figure 24:
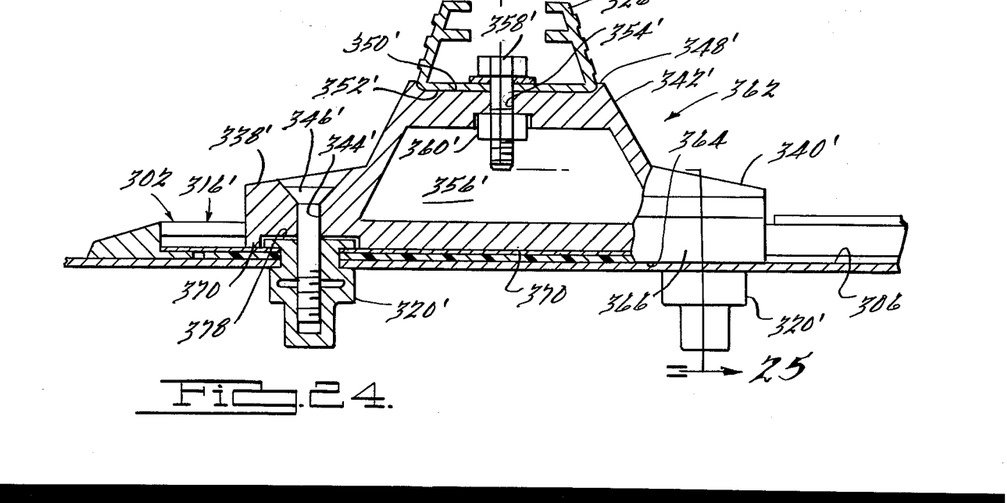
FIG. 24 is a sectional view similar to that of FIG. 22 but illustrating another embodiment of the present invention.
Figure 25:
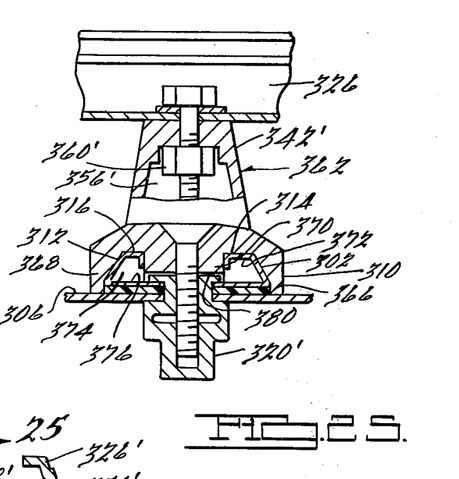
FIG. 25 is a sectional view similar to FIG. 23 but illustrating the embodiment of FIG. 24, the section being taken along line 25—25 of FIG. 24.

Referring now to FIGS. 24 and 25, there is illustrated therein another embodiment of a saddle member 362 in accordance with the present invention shown in installed relationship upon a portion of slat 302. Saddle member 362 is substantially identical to saddle member 330 with the exception of the lower surface portion 364 thereof. Accordingly, corresponding portions are indicated by like numerals primed and further description thereof will be omitted. Lower surface 364 of saddle member 362 includes a pair of longitudinally extending shoulder portions 366 and 368 and a center shoulder portion 370. Center shoulder portion 370, in cooperation with shoulder portion 366, defines a first longitudinally extending recess 372 which is of a shape so as to conform substantially to the contour of upwardly converging sidewall 310 and article supporting surface 314. Similarly, center shoulder portion 370, in cooperation with shoulder 368, defines a second recess 374 also having a contour substantially conforming to the contour of converging sidewall 312 and article supporting surface 316. Thus, as shown, center shoulder portion 370 is of a length so as to extend through opening 318 and supportingly engage surface 376 of slat 302 while shoulder portion 366 and 368 extend downward along the lateral edges of slat 302 and engage vehicle portion 306 thereby dispersing the load placed upon transverse slat 326 over a greater surface area of vehicle portion 306 while also increasing the ability of saddle member 362 to resist lateral forces exerted thereon. Notched portions 378 and 380 may be provided in surface 364 adjacent opposite ends of saddle member 362 so as to provide clearance for well nut fasteners 320' and insure full supporting engagement of surface 364 with surface 376.

While it will be apparent that the preferred embodiments of the invention disclosed are well calculated to provide the advantages above stated, it will be appreciated that the invention is susceptible to modification, variation and change without departing from the proper scope or fair meaning of the subjoined claims.

I claim:
1. An article carrier in combination with an automotive vehicle comprising:
   a pair of substantially parallel spaced longitudinally extending article supporting slats secured to a portion of said vehicle, each of said slats having a lower portion adapted to be supported upon the vehicle, and a pair of spaced upper article supporting surface portions defining a longitudinally extending opening;
   a plurality of fastening elements for securing said article supporting slats to said vehicle spaced longitudinally along said slats and accessible through said longitudinally extending openings;
   at least one article carrying slat extending transversely between said article supporting slats and being supported above said upper article supporting surface portions thereof;
   means on said article carrying slat whereby articles may be adjustably secured thereto at selected longitudinal positions thereon;
   a pair of saddle members associated with said article carrying slat and supporting the same upon said article supporting slats, said saddle members being disposed between the underside of said article carrying slat and said article supporting surface portions; and
   first fastening means for securing said article carrying slat to said saddle members and second fastening means extending from said saddle members into said article supporting slats and being attached to said fastening elements to secure said saddle members upon said article supporting slats, whereby said article carrying slat may be selectively positioned at desired longitudinal locations along said article supporting slats.

2. An article carrier as set forth in claim 1 further comprising a cover member removably disposed in part within each of said longitudinally extending openings and operative to close at least portions of said openings.

3. An article carrier as set forth in claim 1 which includes a pair of parallel transversely extending article carrying slats each of which is supported by a pair of said saddle members.

4. An article carrier as set forth in claim 3 wherein each of said cover members extends between said saddle members mounted on the associated of said article supporting slats.

5. An article carrier as set forth in claim 4 wherein each of said saddle members includes a lower surface defining a recess adapted to at least partially receive the associated of said article supporting slats.

6. An article carrier as set forth in claim 5 wherein said lower surface of each of said saddle members includes a pair of spaced portions engaging said portion of said vehicle adjacent the associated of said article supporting slats.

7. An article carrier as set forth in claim 1 wherein each of said saddle members includes a lower portion supported on the article supporting surface portion of the associated of said article supporting slats and second fastener means cooperating with said fastening elements to secure said saddle member to said associated article supporting slats.

8. An article carrier as set forth in claim 7 wherein each of said saddle members further includes an upper portion adapted to receive and support a portion of said article carrying slat.

9. An article carrier in combination with an automotive vehicle comprising:
   a pair of substantially parallel spaced longitudinally extending article supporting slats secured to a portion of said vehicle, each of said slats having a lower portion and a pair of spaced upper article supporting surface portions defining a longitudinally extending opening;
   a plurality of longitudinally spaced fastening elements securing each of said article supporting slats to said portion of said vehicle;
   a plurality of at least two saddle members supported at least in part upon said upper article supporting surfaces, at least one of said saddle members being disposed on each of said article supporting slats;
   fasteners being attached to said fastening elements to secure said saddle members upon said article supporting slats, whereby said saddle members may be selectively positioned at desired longitudinal positions along said article supporting slats;
   at least one article carrying slat extending transversely between said article supporting slats and supportingly secured to said saddle members,
   said article carrying slat defining a transversely extending slideway between said article supporting slats whereby articles may be secured upon said article carrying slat at selected transverse positions relative to said article supporting slats.

10. An article carrier as set forth in claim 9 wherein said fastening elements include a threaded bore, said fasteners being received within said threaded bore so as to secure said saddle member to said vehicle.

11. An article carrier as set forth in claim 9 wherein said saddle member includes a lower surface having a pair of spaced shoulder portions engaging said upper article supporting surface and an intermediate depending portion disposed in said longitudinal opening.

12. An article carrier as set forth in claim 9 wherein said saddle member further includes a recessed portion in an upper surface thereof, said recessed portion receiving said article carrying slat.

* * * * *